United States Patent [19]

Murray

[11] 3,954,372

[45] May 4, 1976

[54] REINFORCED EXTRUDER FOR HIGH MOLECULAR WEIGHT POLYETHYLENE

[76] Inventor: Coyt E. Murray, Impact Plastics, Inc. P.O. Box 12427, Gastonia, N.C. 28052

[22] Filed: Mar. 21, 1974

[21] Appl. No.: 453,204

Related U.S. Application Data

[63] Continuation-in-part of Ser. No. 613,321, Feb. 1, 1967, abandoned, and a continuation of Ser. No. 814,503, May 24, 1969, abandoned.

[52] U.S. Cl.............................. 425/378 R; 72/271
[51] Int. Cl.².......................................... B29D 23/04
[58] Field of Search.................... 72/271, 273, 467; 249/158, 163, 164; 222/146 R; 425/378, 379, 461; 164/411

[56] References Cited
UNITED STATES PATENTS

| | | | |
|---|---|---|---|
| 521,929 | 6/1894 | Cameron | 249/164 X |
| 2,143,549 | 1/1939 | Edmonds | 425/378 |
| 3,079,638 | 3/1963 | Mille | 222/409 X |
| 3,119,148 | 1/1964 | Chambers et al. | 425/143 |

*Primary Examiner*—Richard B. Lazarus

[57] ABSTRACT

This invention relates to machines for extruding high molecular weight polyethylene shapes or sheets and more particularly to an extruder having reinforcing braces around the barrel thereof, so arranged as to permit the extruder to successfully form material of higher density and quality and in larger sizes than has heretofore been possible.

4 Claims, 8 Drawing Figures

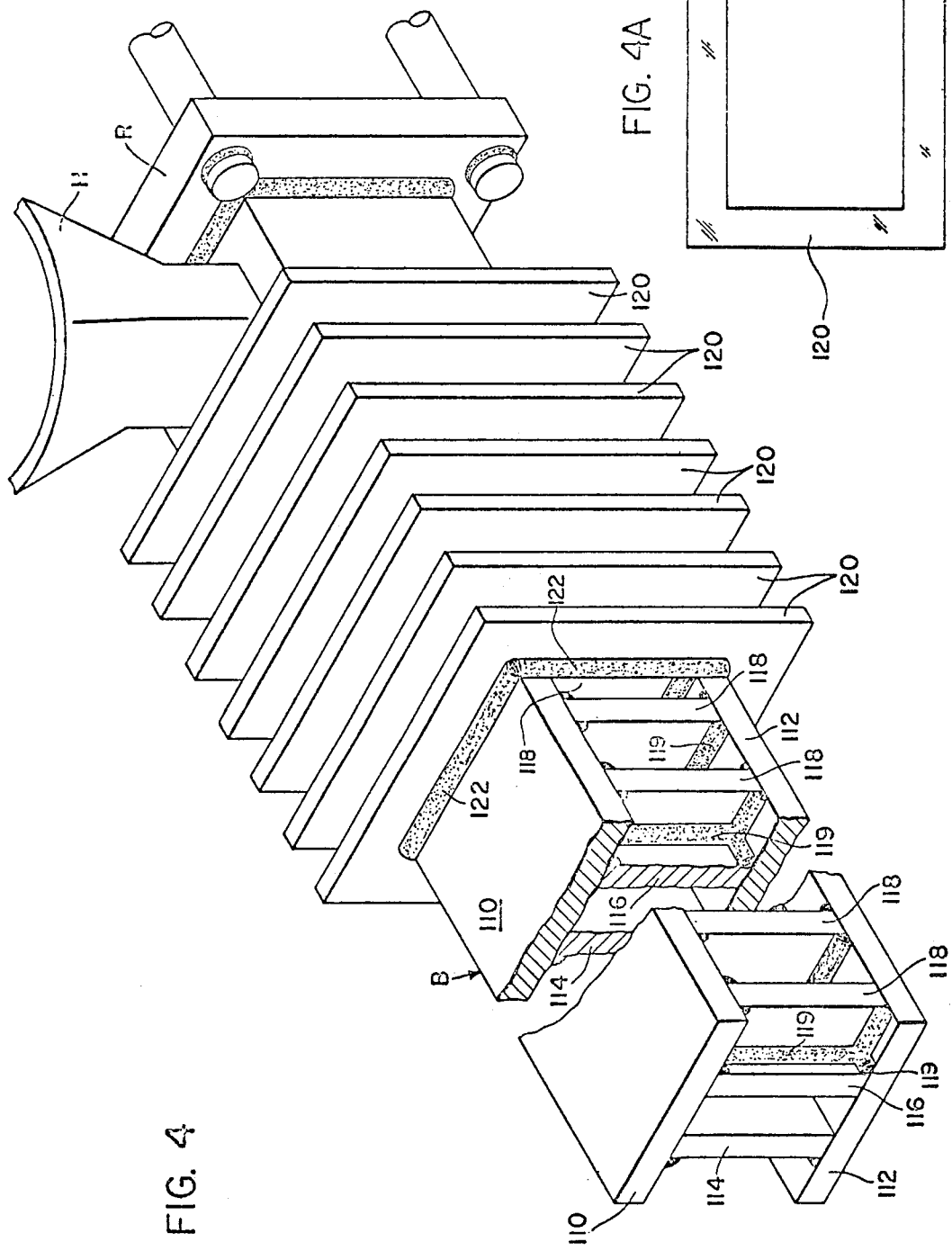

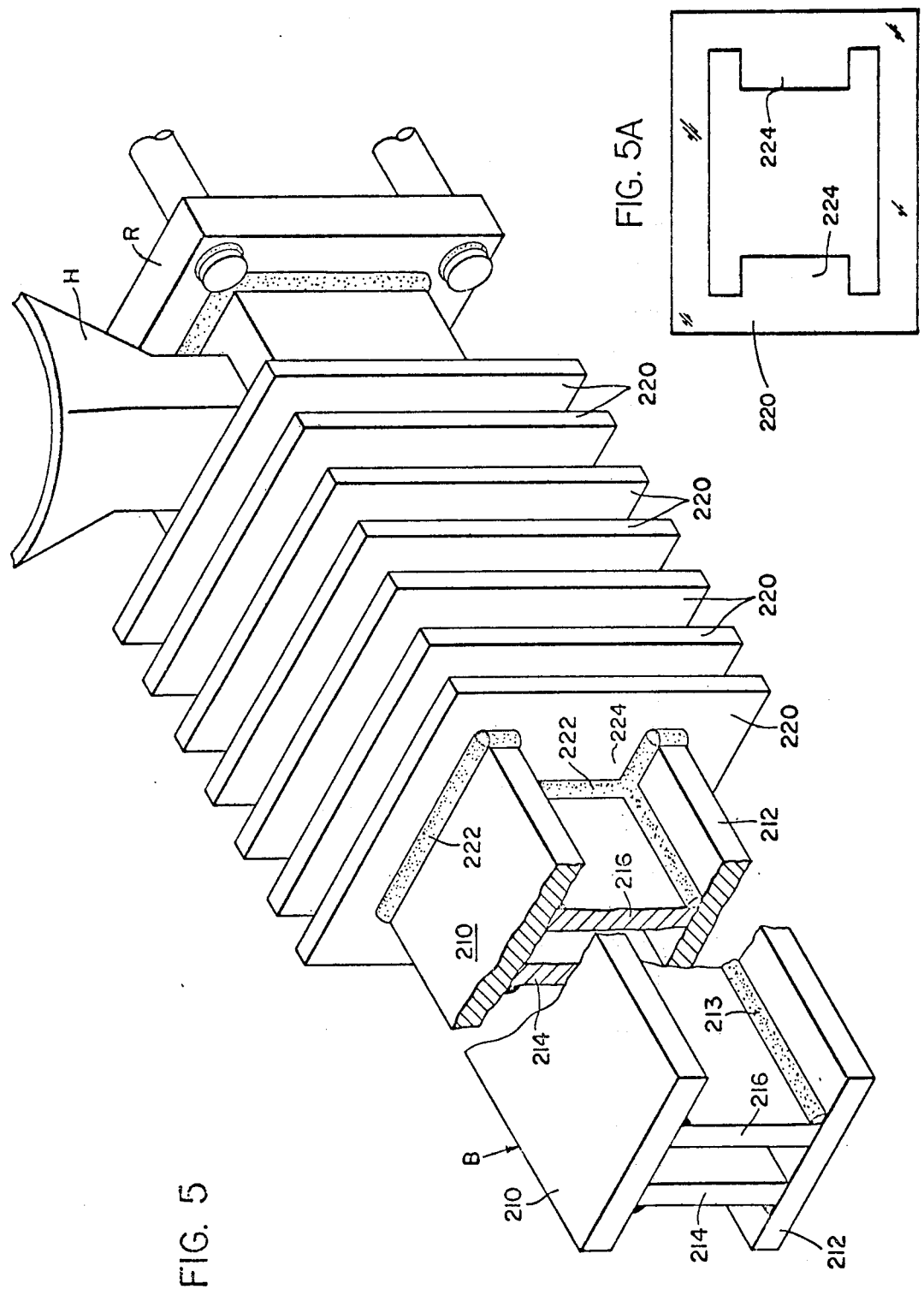

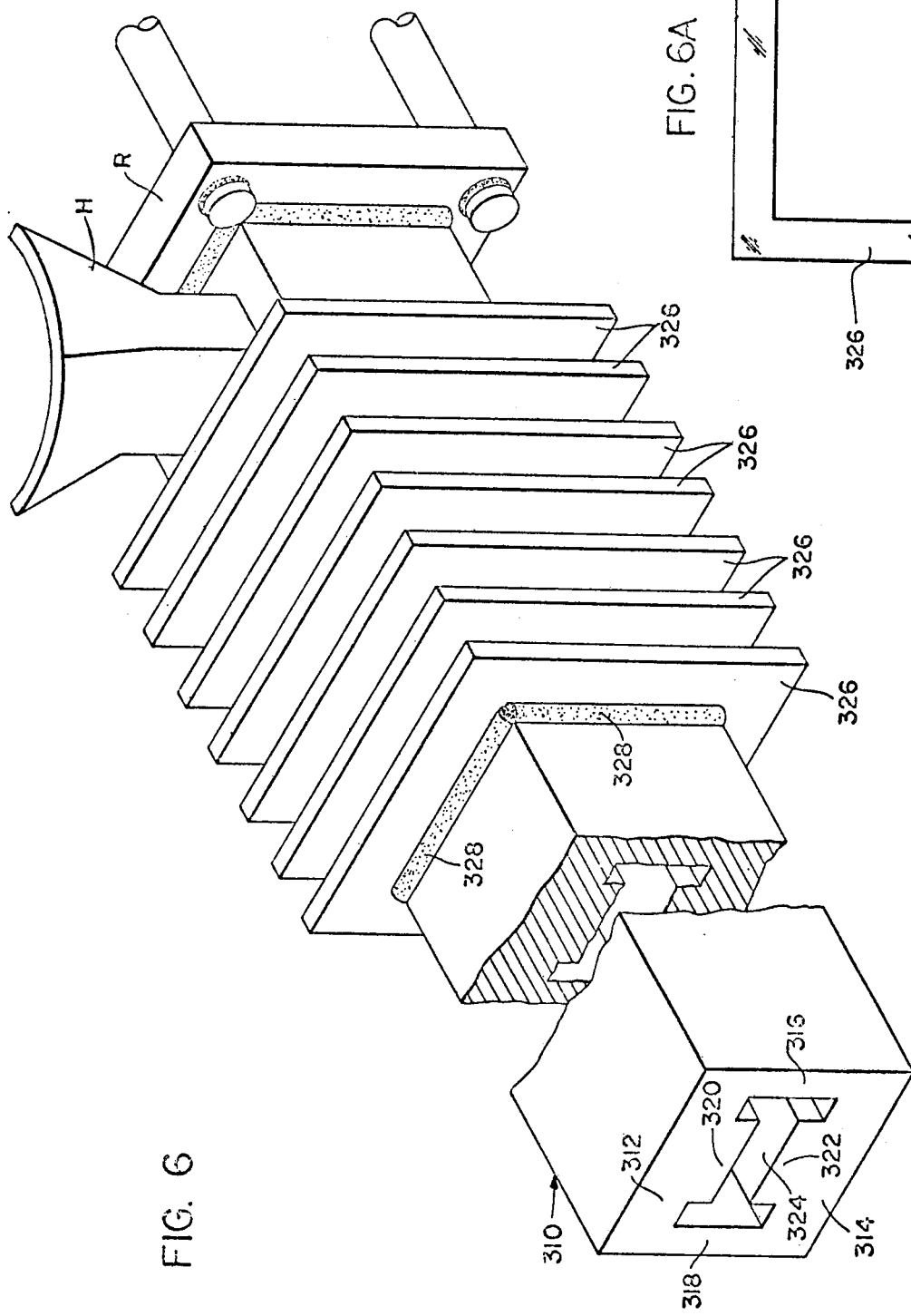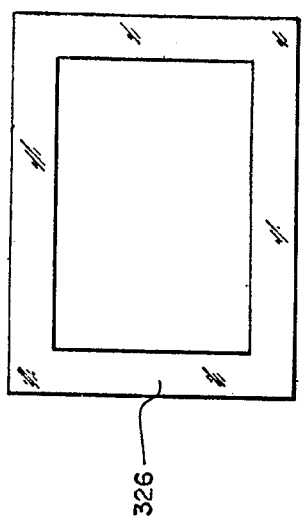

REINFORCED EXTRUDER FOR HIGH MOLECULAR WEIGHT POLYETHYLENE

CROSS REFERENCE TO RELATED APPLICATIONS

This application is a continuation-in-part of applicant's copending application Ser. No. 613,321 filed Feb. 1, 1967 entitled REINFORCED EXTRUDER FOR HIGH MOLECULAR WEIGHT POLYETHYLENE, now abandoned; and is a continuation of applicant's copending application Ser. No. 814,503, now abandoned filed Mar. 24, 1969 entitled REINFORCED EXTRUDER FOR HIGH MOLECULAR WEIGHT POLYETHYLENE. Some of the background of the invention has been explicitly incorporated into this application from applicant's copending application Ser. No. 860,145, filed Aug. 21, 1969 entitled METHOD AND MEANS FOR MAKING HIGH MOLECULAR WEIGHT POLYETHYLENE SHEETS, which is a continuation of application Ser. No. 596,932 filed Nov. 25, 1966 entitled METHOD AND MEANS FOR MAKING HIGH MOLECULAR WEIGHT POLYETHYLENE SHEETS, now abandoned, which has been cited and incorporated by reference in said applications Ser. No. 613,321 and Ser. No. 814,503.

BACKGROUND OF THE INVENTION

A method and means for making high molecular weight polyethylene sheets is described in applicant's copending application Ser. No. 860,145, filed Aug. 21, 1969. As was stated there, the term "high molecular weight polyethylene" means polyethylene or other polymer having a molecular weight of approximately 1,000,000 or greater, and have hot melt tensile strength three to six times greater than that of the usual high density extrusion resins in the molecular weight range of 200,000 to 250,000. By way of further comparison, the usual high density polyethylene extrusion resins in the molecular weight range of up to about 250,000 are about the consistency of molasses and are little more than self-supporting in their amorphous state as they leave the extruder. They can be easily fractured or ruptured in their hot melt or amorphous state by passing a gloved hand through the plastic, the glove being necessary only to protect one from the heat. On the other hand, the polymer resins in the molecular weight of 1,000,000 to 2,000,000 and above with which this invention is concerned exhibit unusual toughness or hot melt strength in the armophous state as it comes from the extruder. In fact, it will not fracture or rupture even when struck with a hammer while in an amorphous state. Such a material, since it is essentially incompressible exerts tremendous outward pressure on the walls of the extruder during the extrusion process. This fact imposes serious limits on the size of the extruded sheets since it has long been known that the outward pressure against the walls of the extruder increases with the cross-sectional size of the sheet and of the extruder.

It was known prior to this invention to transform high molecular weight polyethylene resin from powdered or granular form into rectangular panels or cylindrical billets by a process known in the art as compression molding. The transformation of the powdered or granular resin into a solid form was accomplished by coalescing the material under high pressure and heat above its crystalline melting point of 289°F. and gradually cooling the material while maintaining the high pressure for a prolonged period of time. The amount of pressure and the length of time required to transform the granules into a solid state possessing the above optimum physical properties depends on the quantity of materials being processed, a larger quantity requiring a longer time at the same high pressure. High molecular weight polyethylene is virtually incompressible in its granular, crystalline, or solid form, and the high pressure is required to increase the density of the finished sheet to give it the desired physical properties.

As an example of the conventional molding technique of high molecular weight polyethylene, assume it is desired to produce a sheet of high molecular weight polyethylene about two inches thick by the conventional two-stage molding technique. In the first stage, a cold preform is made of the granular raw material, and the second stage comprises melt sintering of the preform. The preform is made by placing the granular raw material into a block form of the desired 2-inch thickness and subjected to pressure of about 1400–2800 psi for 5 to 10 minutes. This results in a preform which with careful handling can be taken from the form. Normally, this cold-pressed block is loaded into the mold which is then placed in a press heated to 350° to 400°F. A time of two to three hours is necessary for the melting of these blocks without defects.

At the beginning of the melting, the block is loaded with a pressure of 300–700 psi on the preformed plastic. After the prescribed heating time of two to three hours, the block must be cooled for about one hour under pressure. During this cooling, a gradual increase of pressure is recommended. A pressure of 2500 psi or more must be attained on the plastic at the end of the cooling, to minimize voids on the interior and sunken spots on the surface of the blocks. Care should be taken so that the sides of the block do not cool faster than the center, and that pressure is uniformly distributed.

The necessity of carefully controlling the temperature of the mass of high molecular weight polyethylene during its transformation from powdered form to a solid slab has heretofore caused the use of extremely heavy molds capable of exerting the required high pressure and maintaining the desired heat for the necessary length of time to produce a satisfactory slab or shape. Production under such procedures is necessarily slow and costly, but the resulting end products fabricated from the sheets have found acceptance in several industries where the physical properties of high molecular weight polyethylene have proven advantageous. These physical properties, which have been briefly noted above, are more fully set forth in a publication of Hercules Powder Company, Incorporated, Wilmington, Del., entitled "HERCULES TECHNICAL DATA HIGH FAX N0. 30; PROPERTIES, USES, AND FABRICATION OF THE HIGH FAX 1900 SERIES; A Very High Molecular Weight, High Density Polyethylene With Unique Shock and Abrasion Resistance."

High molecular weight polyethylene has proven useful in the textile industry, for example, where it has been fashioned into pickers which drive a pound and a half sharpened steel-tipped shuttle back and forth across a loom more than 200 times a minute. High molecular weight polyethylene has gained a wide acceptance in the paper industry as a material for suction box covers because of its low coefficient of friction. The abrasion resistance of high molecular weight polyethylene lends to use as wear strips, its adaptability for this use also being enhanced by its low coefficient of friction. The discussion of the end uses of high molecular weight polyethylene is not in any way intended to be exhaustive but merely illustrative and for the purpose of pointing out the advantages of the present invention.

It is emphasized that the desirable physical characteristics of high molecular weight polyethylene are not attainable unless the high molecular weight polyethylene is transformed from powder form to a solid state or slab under carefully controlled conditions of pressure and temperature.

One advantage of the high molecular weight polyethylene products is their tremendous strength, although first attainable only by compression molding, may be more efficiently produced by a certain technique of ram extrusion. It has been previously known to extrude high molecular weight polyethylene from a granular form to a solid state, but all such previously known extrusions have been of a relatively small size because of the considerable length of time required to uniformly dissipate the heat from a large mass of high molecular weight polyethylene. An increase in the cross-sectional dimension of the extruded mass of high molecular weight polyethylene increases the thermal expansion of the high molecular weight polyethylene within the extruder. It is the tremendous thermal expansion inherent in high molecular weight polyethylene which enables it to be satisfactorily processed through an open-ended extruder. Otherwise, there would be no way to apply the necessary high pressures to the heated resin to produce a product having the desired physical properties.

SUMMARY OF THE INVENTION

Since the granular resin that goes into the extruder must be completely cooked and gradually cooled under controlled pressure, the ram type extruders are desirably of maximum length for economical processing, i.e., the longer the extruder the more material it can process within a given length of time while allowing successive charges of resin to remain in the extruder the required time for adequate processing. The increased length adds to the amount of outward pressure exerted on the walls of the extruder by the resin which, as stated, exerts tremendous outward pressure on the walls of the extruder during the extrusion process.

Also, it is necessary in the extrusion of high molecular weight polyethylene during its transformation from powdered form to a solid slab to carefully control the temperature of the mass of resin in order that the end product have a uniform density and be free of voids and the like.

Another problem in the extrusion of these high molecular weight polyethylene shapes is that the increased length of the extruder results in a corresponding increase in the surface area of the walls of the extruder. The walls are formed from steel sheets welded together at room temperature to form the sides of the extruder. When the extruder is heated to operating temperature, stresses due to the expansion caused many problems in the extrusion of high molecular weight polyethylene.

Another problem has arisen due to the use of the altering die and braking system at the outlet end of the extruder as described in applicant's copending application, Ser. No. 596,932 filed Nov. 25, 1966. The altering die increases back pressure on the extruded plastic within the barrel of the extruder as much as 10 to 30 per cent, while the braking system or finishing die increases the pressure 2 to 5 per cent.

As has been explained, the controlled cooling of the high molecular weight polyethylene is an important step in attaining desired physical properties and the problem of balancing the internal stresses in the amorphous state is complicated during extrusion because the central material adjacent the longitudinal axis of the extruded material tends to travel faster through the barrel of the extruder than the material adjacent the peripheral edges due to the frictional engagement of the periphery of the slab with the inner wall of the barrel of the extruder. This internal "creepage" is not as significant a factor in the compression molding of high molecular weight polymers but it becomes a stronger factor in affecting the quality of the finished product as the size of the shape or sheet increases in extrusion molding.

OBJECTS OF THE INVENTION

It is therefore an object of this invention to provide an improved extruder, much stronger than those heretofore used in the industry.

It is also an object of this invention to provide an extruder which aids in the controlling of the temperature within the extruder by evening the temperature in the side walls and thus making the temperature applied to the plastic in its amorphous state more uniform.

It is another object of this invention to provide a reinforced extruder whose walls resist cracking due to stresses in the barrel walls caused by heating and cooling of the extruder.

It is a still further object of this invention to provide an improved extruder for transforming high molecular weight polyethylene from its powdered or granular form to a solid state wherein novel strengthening means are provided around the periphery of the extruder for strengthening as well as controlling the heat applied to the mass of resin inside the extruder.

It is another object of this invention to provide an improved ram type extruder which will allow molecular chains to set up in the extruded plastic and become longer, thus making a stronger product, without rupturing the walls of the extruder.

DESCRIPTION OF THE DRAWINGS

Some of the objects of the invention have been stated and other objects will appear to those skilled in the art from the following description when read in conjunction with the accompanying drawings, in which

FIG. 4 is a view similar to FIG. 1, except showing an alternate embodiment of the invention;

FIG. 5 is a view similar to FIG. 1, except showing a second alternate embodiment of the invention; and FIG. 6 is a view similar to FIG. 1, except showing a third alternate embodiment of the invention.

FIGS. 4A, 5A and 6A are elevation views illustrating the configuration of the outer braces removed from the extruder in respective FIGS. 4, 5 and 6.

Figure 1:
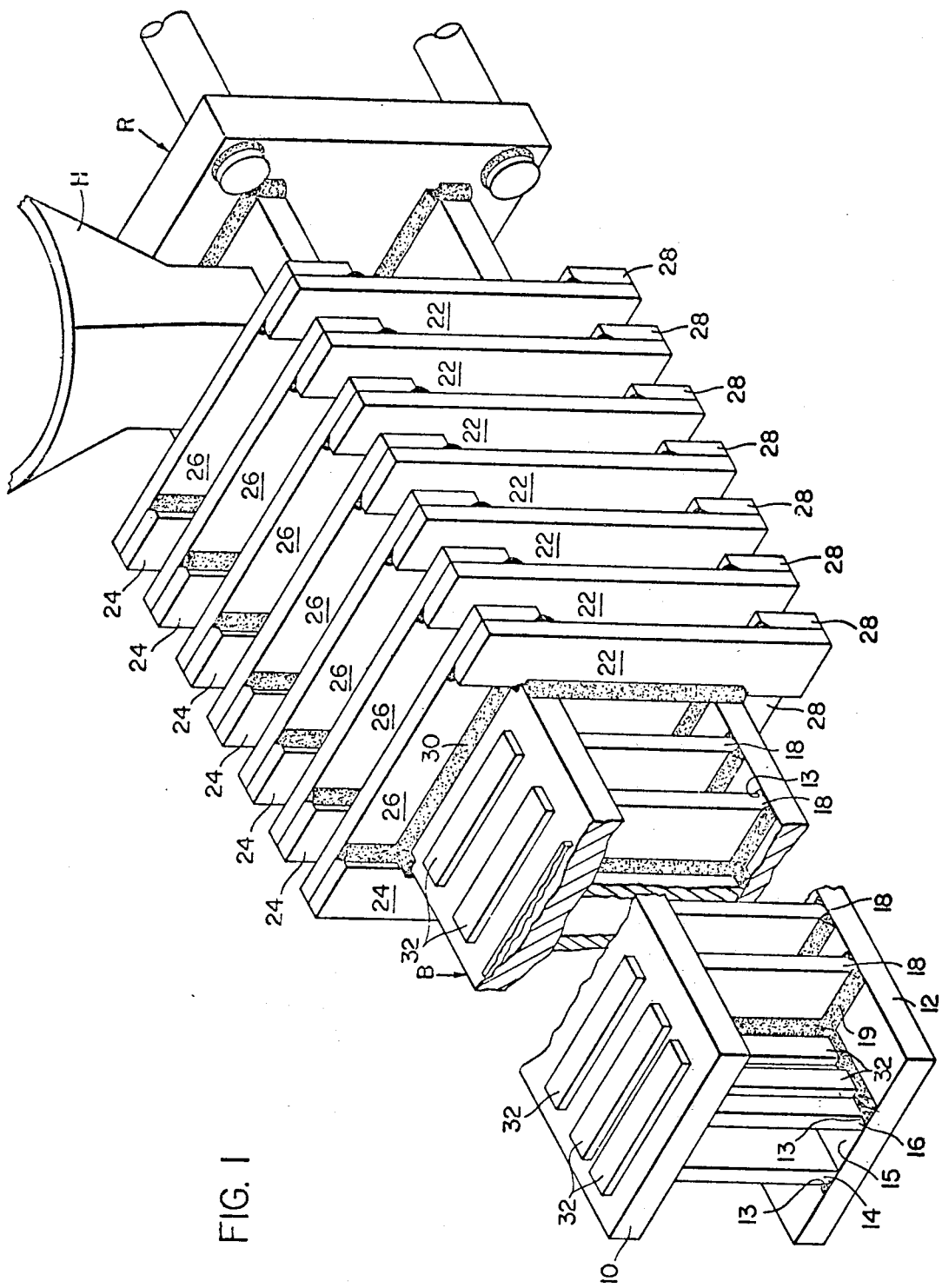
FIG. 1 is a fragmentary perspective view of the extruder with parts broken away.

The extruder, as shown in the drawings, comprises a hopper H in which the granular high molecular weight polyethylene resin is initially received. The resin is periodically fed into a chamber designated at V in FIG. 2 directly beneath the hopper at the rear of the extruder. Extending rearwardly from the resin receiving chamber V is a suitable ram and cylinder arrangement R for ramming successive increments of the granular raw material into the inlet of the extruder. By way of illustration, but not as a limitation, the ram applies an initial pressure of from 2500 psi to 4000 psi on the granular resin in the chamber V. The resin is not heated until it is moved under force of the ram into the compression zone W wherein the resin is initially heated to a temperature of 450° to 500°F.

From the compression zone the resin in its heated state is forced into the transition or plasticizing zone designated as section X wherein the resin remains subjected to a heat of from 450° to 500°F. and reaches its amorphous state. In sections W and X the outward pressure applied by the tremendous thermal expansion of the plastic is at a maximum and is sufficient to hold the plastic against axial movement in the extruder while the ram is withdrawn to permit a new charge of resin to be received in chamber V. From transition zone X the plastic is forced by successive strokes of the ram into cooling zones Y and Z wherein the mass is still subjected to heat but of a lesser magnitude of about 380° to 400°F. in zone Y, and from about 300° to 310°F. in the final cooling zone Z.

Figure 2:
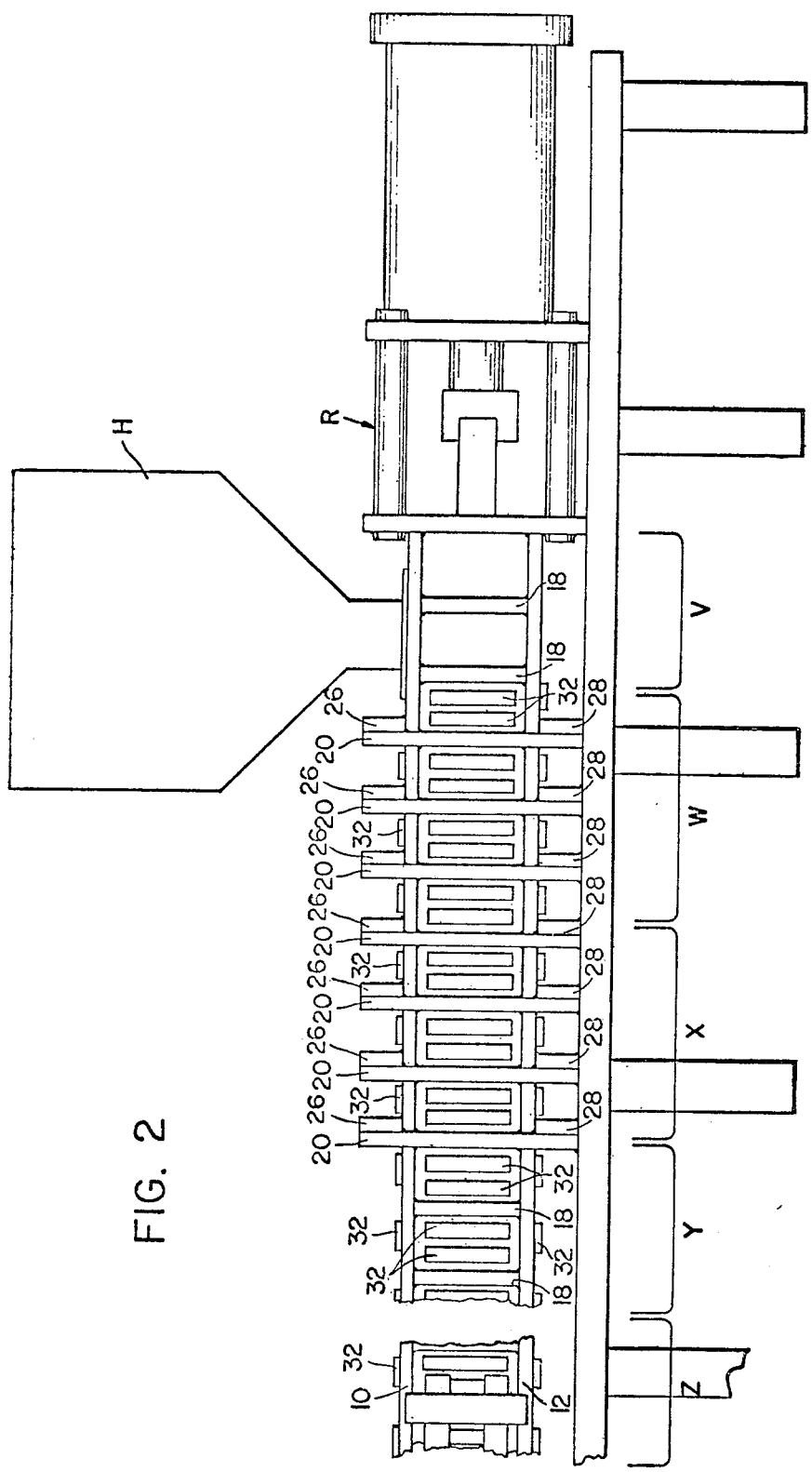
FIG. 2 is a somewhat schematic side elevation of the inlet end of the extruder and its associated hopper and ram assembly, with parts broken away adjacent the outlet end of the extruder.
Figure 3:
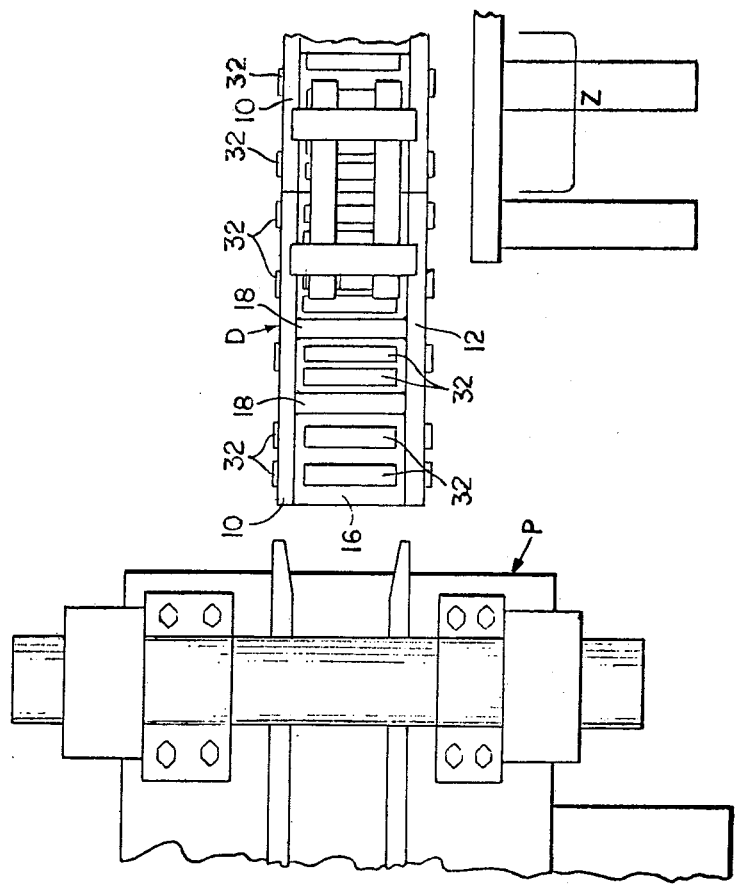
FIG. 3 is a view similar to FIG. 2 of the outlet end of the extruder and its associated altering and finishing dies.

The extruder barrel B as illustrated in the embodiment shown in FIG. 1 through 3 houses the zones V to X and comprises upper and lower walls 10 and 12 and side walls 14 and 16, welded together to form a passageway designated in FIG. 1 as 15 and within which the resin is processed. Side walls 14 and 16 are inwardly spaced from the lateral edges of top and bottom walls 10 and 12 to accommodate inside vertical braces 18 extending between top and bottom walls 10 and 12 and welded to side walls 14 and 16 at spaced intervals. A continuous weld bead 19 on each side of each brace 18 joins the top, bottom and one edge of the braces 18 to the walls of the barrel B.

The compression chamber W and transition chamber X are surrounded by outer braces 20 each of which includes a first pair of opposed vertical side plates 22 and 24 and a second pair of opposed horizontal upper and lower plates 26 and 28. Each of plates 22, 24, 26 and 28 include a length dimension at least equal to the corresponding transverse dimension of walls 10, 12, 14 and 16; a thickness dimension; and a width dimension at least equal to the thickness dimension. Plates 26 and 28 are then joined to walls 10 and 12 throughout at least the thickness dimension of plates 26 and 28. Plates 22 and 24 are arranged in juxtaposition with the inside braces 18 and are joined to the top and bottom walls of the extruder by a continuous weld bead 30. At the point where side braces 22 and 24 are adjacent the inside braces 18, they are joined together with a continuous weld bead. For increased strength, all weld beads are formed after first bevelling the edge of one plate on its surface opposite the passageway and forming the weld bead in the space thus created. Thus, plate 16 is bevelled as at 13 which has the advantage of locating the weld bead closer to the passageway 15. So arranged, there is less chance of the plates 14 and 16 buckling at their junctures with plates 10 and 12 under pressure of the plastic. The altering die D and finishing die or braking system P exert a back pressure on the extruded mass which is communicated back into the barrel B of the extruder to produce additional outward pressure on the walls thereof. In the example shown, the outer braces 20 are provided only throughout compression zone W and transition zone X, however, for increased strength, if desired, the braces might be employed completely down the length of the extruder and also around the walls of the die.

Heating elements 32 are provided between the braces 20 to heat the four walls 10, 12, 14, 16 and the passage 15 of the extruder barrel. These heating elements 32 are controlled by thermocouples and are the means for providing the controlled temperatures within the zones W, X, Y and Z as above described.

FIGS. 4 through 6 illustrate other embodiments of the invention. FIG. 4 shows an extruder barrel B in which the side walls 114 and 116 are inwardly spaced from the lateral edges of top and bottom walls 110 and 112 to accommodate inside braces 118 extending between upper and lower walls 110 and 112 and welded to respective side walls 114 and 116 at spaced intervals. As is the case in the embodiment shown in FIG. 1, a continuous weld bead 119 on each side of each brace 118 joins the top, bottom and one edge of the brace 118 to the walls of barrel B.

This modified form of the invention includes an outer brace 120 which is an integral rectangular plate having a passageway therethrough approximately the same size as the outer dimensions of barrel B. A continuous weld bead 122 joins outer brace 120 on either side thereof to barrel B and to inner brace 118 along the line where outer brace 120 and inner brace 118 are juxtaposed. Such an arrangement eliminates the assembly of the four piece brace as is necessary in the embodiment shown in FIG. 1.

In FIG. 5, the barrel B comprises upper and lower walls 210 and 212 and side walls 214 and 216, the aforementioned walls being joined by a weld bead 213. This embodiment is distinctive in the omission of the inner braces 18 or 118 described as separate bracing elements in the two embodiments described hereinabove. Outer braces 220 comprise a rectangular plate having a horizontally disposed H-shaped passageway therethrough and includes central projections 224 which extend inwardly into the recess formed on one side between upper wall 210, lower wall 212 and side wall 216, and into the recess formed on the other side by upper wall 210, lower wall 212 and side wall 214. As is the case in the other two embodiments, a continuous weld bead 222 joins brace 220 to barrel B.

The third alternate embodiment is shown in FIG. 5 and is particularly useful in cases where the shape of the plastic being extruded is other than rectangular. For example, passageway 324 in barrel 310 is substantially H-shaped, and barrel 310 comprises a relatively solid longitudinal member comprising upper and lower portions 312 and 314 and side portions 316 and 318. Abutments 320 and 322 extend downwardly from upper portion 312 and upwardly from portion 314 respectively to form the indentations in the material being processed. Outer braces 326 comprise a relatively rectangular plate having a rectangular opening therethrough approximately the same size and configuration as the outer periphery of barrel 310, and a continuous weld bead 328 extends peripherally around the barrel joining each brace 326 to the periphery of said barrel.

There is thus provided an improved and strengthened extruder for transforming high molecular weight polymers from a granular to a solid state wherein the resulting product is of a superior quality, and the extruder itself is less likely to rupture due to heat and pressures exerted thereagainst.

In the drawings and specifications, there have been set forth preferred embodiments of the invention, and although specific terms are employed, they are used in a descriptive sense only and not for purposes of limitation, the scope of the invention being defined in the claims.

What is claimed is:

1. In an extruder for converting from a granular to a solid state high molecular weight polyethylene resin having a molecular weight of at least 1,000,000 and possessing an inherent characteristic of tremendous outward expansion when subjected to the requisite processing heat and requiring the application of carefully controlled heat to first coalesce the discrete resinous particles into an amorphous state and to then cool the amorphous mass uniformly, said extruder comprising a longitudinally extending barrel including two pairs of opposed parallel substantially flat walls defining an elongated passageway within which said high molecular weight polyethylene resin is processed from a granular form to an amorphous mass, a reciprocable ram operable at one end of said passageway to force the high molecular weight polyethylene resin into said passageway, means for feeding high molecular weight polyethylene resin into said one end of the passageway in advance of the ram in its withdrawn position, means for variably heating the walls of said barrel along its length to define, successively, from said one end a compression zone, a transsition zone and a cooling zone, said reciprocable ram being operable to advance successive charges of high molecular weight polyethylene resin from said one end of the extruder into the compression zone and through the successive transition and cooling zones and out the other end of the extruder, means reinforcing the walls defining at least the compression zone of the extruder, said means comprising a plurality of braces surrounding the barrel and spaced axially from each other along at least the compression zone of the barrel, and two opposed walls of the extruder are spaced inwardly from the outer edges of the other pair of opposed walls and a plurality of axially spaced inner braces extend into the space formed between one pair of said opposed walls and the outer of another opposed wall.

2. The reinforced extruder according to claim 1 at least some of the inner braces are formed integrally with the outer braces.

3. A reinforced extruder according to claim 1 wherein each of said outer braces comprise a plurality of elongated bars joined together adjacent the ends to form a polygon having the same number of sides as said extruder barrel, one longitudinal edge of each bar being joined to a side of the extruder barrel transverse to the axis of said barrel, and some of the bars in said outer braces being juxtaposed to said inner braces.

4. A reinforced extruder according to claim 1 wherein said inner and outer braces are joined to the sides of said barrel and to each other by continuous weld beads to give added strength to said barrel.

* * * * *